(12) United States Patent
Hong et al.

(10) Patent No.: US 12,355,900 B2
(45) Date of Patent: Jul. 8, 2025

(54) APPARATUS AND METHOD FOR MUTUAL AUTHENTICATION OF QUANTUM ENTITIES BASED ON MEASUREMENT-DEVICE-INDEPENDENT QUANTUM KEY DISTRIBUTION

(71) Applicant: ELECTRONICS AND TELECOMMUNICATIONS RESEARCH INSTITUTE, Daejeon (KR)

(72) Inventors: Chang-Ho Hong, Daejeon (KR); Se-Wan Ji, Daejeon (KR); O-Sung Kwon, Daejeon (KR); Youn-Chang Jeong, Daejeon (KR); Eun-Ji Kim, Daejeon (KR); Seok Kim, Daejeon (KR); Haeng-Seok Ko, Daejeon (KR); Dae-Sung Kwon, Daejeon (KR); Jin-Gak Jang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 180 days.

(21) Appl. No.: 18/126,215

(22) Filed: Mar. 24, 2023

(65) Prior Publication Data
US 2024/0089124 A1 Mar. 14, 2024

(30) Foreign Application Priority Data
Aug. 31, 2022 (KR) .................. 10-2022-0109724

(51) Int. Cl.
H04L 29/06 (2006.01)
H04L 9/08 (2006.01)
H04L 9/32 (2006.01)

(52) U.S. Cl.
CPC ............ *H04L 9/3273* (2013.01); *H04L 9/085* (2013.01); *H04L 9/0852* (2013.01)

(58) Field of Classification Search
None
See application file for complete search history.

(56) References Cited

U.S. PATENT DOCUMENTS

| | | | | |
|---|---|---|---|---|
| 7,899,183 | B2* | 3/2011 | Tajima | H04L 9/0662 713/168 |
| 8,483,394 | B2* | 7/2013 | Nordholt | H04L 63/062 380/278 |

(Continued)

OTHER PUBLICATIONS

Hoi-Kwong Lo et al., "Measurement-Device-Independent Quantum Key Distribution," Physics review letters, Mar. 30, 2012.

(Continued)

*Primary Examiner* — Maung T Lwin
(74) *Attorney, Agent, or Firm* — LRK PATENT LAW FIRM

(57) ABSTRACT

Disclosed herein are an apparatus and method for mutual authentication of quantum entities based on Measurement-Device-Independent Quantum Key Distribution (MDI-QKD). The method may include configuring a quantum input form based on an authentication key shared in advance with a counterpart entity, applying polarization modulation to the configured quantum input form, transmitting the quantum input form to which polarization modulation is applied to a quantum measurement device, and authenticating the counterpart entity by checking whether the counterpart entity configures a quantum input form according to the shared authentication key using a measurement result and information about polarization modulation.

13 Claims, 4 Drawing Sheets

(56) References Cited

U.S. PATENT DOCUMENTS

| | | | |
|---|---|---|---|
| 11,082,216 B2* | 8/2021 | Bucklew | H04B 10/66 |
| 2016/0191173 A1* | 6/2016 | Malaney | H04L 9/0852 |
| | | | 455/899 |
| 2020/0351086 A1* | 11/2020 | Walenta | H04L 9/083 |
| 2021/0266157 A1* | 8/2021 | Hong | H04L 9/0852 |
| 2022/0029798 A1* | 1/2022 | Guo | G02B 27/0068 |

OTHER PUBLICATIONS

Piotr Zawadzki, "Quantum identity authentication without entanglement," Quantum Information Processing, Nov. 19, 2018.

Ji-Woong Choi et al., "Measurement-device-independent mutual quantum entity authentication", Quantum Information Processing (2021) 20:152, https://doi.org/10.1007/s11128-021-03093-1.

* cited by examiner

APPARATUS AND METHOD FOR MUTUAL AUTHENTICATION OF QUANTUM ENTITIES BASED ON MEASUREMENT-DEVICE-INDEPENDENT QUANTUM KEY DISTRIBUTION

CROSS REFERENCE TO RELATED APPLICATION

This application claims the benefit of Korean Patent Application No. 10-2022-0109724, filed Aug. 31, 2022, which is hereby incorporated by reference in its entirety into this application.

BACKGROUND OF THE INVENTION

1. Technical Field

The present invention relates generally to technology for authenticating quantum entities and more particularly to technology for authenticating quantum entities based on measurement-device-independent quantum key distribution.

2. Description of the Related Art

In quantum cryptography communication, a Quantum Key Distribution (QKD) scheme has been proved to theoretically provide unconditional security, regardless of the computing power of attackers. Although the QKD scheme has been proved to be secure, the possibility that theoretical unconditional security is damaged in an implementation process due to the incompleteness of implementation devices has been raised. However, it has been proved that QKD implemented with such incomplete devices is also able to provide complete security.

However, as side-channel attack schemes using the incompleteness of devices used for implementation of QKD became public, "measurement-device-independent quantum key distribution (MDI-QKD)", in which security is not affected by the imperfection of a measurement device, has been proposed as one of measures for defending against such attacks.

QKD requires entity authentication as a prerequisite for security, but because entity authentication is based on an existing modern cryptography authentication system, it may threaten the information-theoretic security of QKD. Accordingly, authentication technology that is strong against a side-channel attack on a measurement device and is compatible with MDI-QKD without an additional device is required.

SUMMARY OF THE INVENTION

An object of the disclosed embodiment is to guarantee security of quantum entity authentication even when a measurement device is exposed to an attacker or the measurement device is not reliable.

Another object of the disclosed embodiment is to provide quantum entity authentication that is secure against a side-channel attack on a measurement device.

A further object of the disclosed embodiment is to provide a quantum entity authentication scheme that is compatible with a measurement-device-independent quantum key distribution (MDI-QKD) protocol without an additional device.

A method for mutual authentication of quantum entities based on MDI-QKD according to an embodiment may include configuring a quantum input form based on an authentication key shared in advance with a counterpart entity, applying polarization modulation to the configured quantum input form, transmitting the quantum input form to which the polarization modulation is applied to a quantum measurement device, and authenticating the counterpart entity by checking whether the counterpart entity configures a quantum input form according to the shared authentication key using a measurement result and polarization modulation information.

Here, configuring the quantum input form may comprise varying a generation basis of a quantum state depending on the value of the shared authentication key.

Here, configuring the quantum input form may comprise configuring a specific number of positions therein with a fixed quantum state agreed on between users or a random quantum state depending on the result value of a predetermined operation ($T_j$) performed on a preset length of an authentication key in the shared authentication key, the predetermined operation being agreed on between the users.

Here, authenticating the counterpart entity may comprise calculating the error rate of a channel based on the measurement result, and if the random quantum state is used when configuring the quantum input form, the error rate of the channel may be calculated by exchanging the random quantum state with the counterpart entity.

Here, applying the polarization modulation may comprise adjusting the ratio of operators of the polarization modulation so as to control an error rate by a simultaneous detection event according the authentication key.

Here, authenticating the counterpart entity may comprise checking whether an error rate statistic of the measurement result falls within a normal range based on information about adjustment of the ratio of the operators of the polarization modulation.

A method for mutual authentication of quantum entities based on MDI-QKD according to an embodiment may include configuring a quantum input form based on an authentication key shared in advance with a counterpart entity, transmitting the configured quantum input form to a quantum measurement device, acquiring polarization modulation information from the counterpart entity by requesting the same, and authenticating the counterpart entity by checking whether the counterpart entity configures a quantum input form according to the shared authentication key using a measurement result and the polarization modulation information acquired from the counterpart entity.

Here, configuring the quantum input form may comprise varying a generation basis of a quantum state depending on the value of the shared authentication key.

Here, configuring the quantum input form may comprise configuring a specific number of positions therein with a fixed quantum state agreed on between users or a random quantum state depending on the result value of a predetermined operation ($T_j$) performed on a preset length of an authentication key in the shared authentication key, the predetermined operation being agreed on between the users.

Here, authenticating the counterpart entity may comprise calculating the error rate of a channel based on the measurement result, and if the random quantum state is used when configuring the quantum input form, the error rate of the channel may be calculated by exchanging the random quantum state information with the counterpart entity.

An apparatus for authenticating quantum entities according to an embodiment includes memory in which at least one program is recorded and a processor for executing the program. The program may perform configuring a quantum input form based on an authentication key shared in advance with a counterpart entity, transmitting the configured quantum input form to a quantum measurement device, and authenticating the counterpart entity based on a measurement result for the quantum input form, which is disclosed by the quantum measurement device.

Here, when configuring the quantum input form, the program may vary a generation basis of a quantum state depending on the value of the shared authentication key.

Here, when configuring the quantum input form, the program may configure a specific number of positions in the quantum input form with a fixed quantum state agreed on between users or a random quantum state depending on the result value of a predetermined operation ($T_j$) performed on a preset length of an authentication key in the shared authentication key, the predetermined operation being agreed on between the users.

Here, when the result value of the predetermined operation ($T_j$) is '0', the program may configure a quantum input with a single position, and when the result value of the predetermined operation ($T_j$) is '1', the program may configure the quantum input with two positions.

Here, when authenticating the counterpart entity, the program may calculate the error rate of a channel based on the measurement result, and if the random quantum state is used when configuring the quantum input form, the program may calculate the error rate of the channel by exchanging the random quantum state information with the counterpart entity.

Here, the program may further perform applying polarization modulation to the configured quantum input form. When transmitting the configured quantum input form, the program may transmit the quantum input form to which the polarization modulation is applied, and when authenticating the counterpart entity, the program may check whether the counterpart entity configures a quantum input form according to the shared authentication key using the measurement result and information about the polarization modulation.

Here, when applying the polarization modulation, the program may adjust the ratio of operators of the polarization modulation so as to control an error rate by a simultaneous detection event according to the authentication key.

Here, when authenticating the counterpart entity, the program may check whether an error rate statistic of the measurement result falls within a normal range based on information about adjustment of the ratio of the operators of the polarization modulation.

Here, the program may further perform acquiring polarization modulation information from the counterpart entity by requesting the same, and when authenticating the counterpart entity, the program may check whether the counterpart entity configures a quantum input form according to the shared authentication key using the measurement result and the polarization modulation information acquired from the counterpart entity.

Here, when authenticating the counterpart entity, the program may check whether an error rate statistic of the measurement result falls within a normal range based on information about adjustment of the ratio of operators of polarization modulation, which is acquired from the counterpart entity.

BRIEF DESCRIPTION OF THE DRAWINGS

The above and other objects, features, and advantages of the present invention will be more clearly understood from the following detailed description taken in conjunction with the accompanying drawings, in which.

DESCRIPTION OF THE PREFERRED EMBODIMENTS

Figures 1, 2:
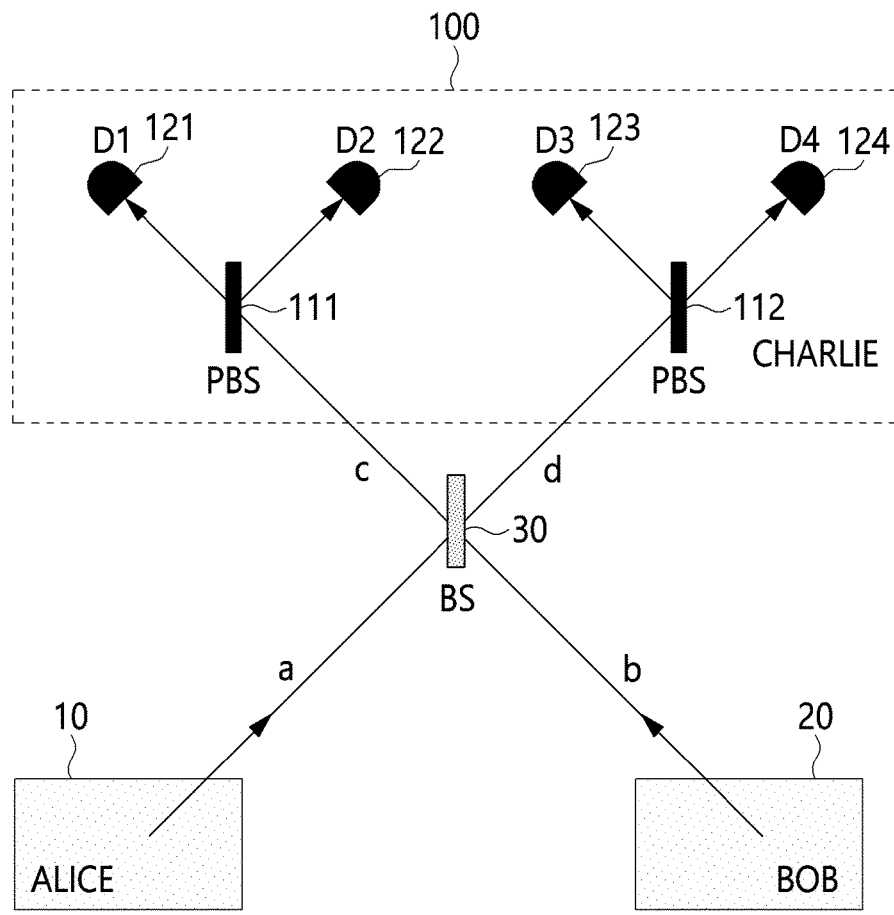
FIG. 1 is a view illustrating an MDI-QKD system.
FIG. 2 is an exemplary view of a quantum input form at a specific position j according to an embodiment.

The advantages and features of the present invention and methods of achieving the same will be apparent from the exemplary embodiments to be described below in more detail with reference to the accompanying drawings. However, it should be noted that the present invention is not limited to the following exemplary embodiments, and may be implemented in various forms. Accordingly, the exemplary embodiments are provided only to disclose the present invention and to let those skilled in the art know the category of the present invention, and the present invention is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present invention.

The terms used herein are for the purpose of describing particular embodiments only, and are not intended to limit the present invention. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, an apparatus and method for mutual authentication of quantum entities based on measurement-device-independent quantum key distribution (MDI-QKD) according to an embodiment will be described in detail with reference to FIGS. 1 to 5.

First, general measurement-device-independent quantum key distribution (MDI-QKD) is described with reference to FIG. 1.

FIG. 1 is a view illustrating an MDI-QKD system.

Referring to FIG. 1, in an MDI-QKD system, multiple entities 10 and 20 may securely share keys based on information disclosed by a quantum measurement device 100, regardless of the security of the quantum measurement device 100.

In FIG. 1, it can be seen that the entity 10, the entity 20, and the quantum measurement device 100 are represented as Alice, Bob, and Charlie, respectively.

Charlie, corresponding to the quantum measurement device 100, includes polarization beam splitters (referred to as 'PBS' hereinbelow) 111 and 112 and single-photon detectors D1 (121), D2 (122), D3 (123), and D4 (124).

Each of the PBSs 111 and 112 may transmit or reflect light depending on a quantum state incident thereto. That is, the PBSs 111 and 112 transmit light when the input quantum state is |H⟩, and reflect light when the input quantum state is |V⟩.

For example, when the quantum state incident to the PBS 111 in FIG. 1 is |H⟩, the detector D1 121 may respond thereto, and when the quantum state incident to the PBS 111 is |V⟩, the detector D2 122 may respond thereto.

Meanwhile, referring to FIG. 1, the operator UBs of a beam splitter (referred to as 'BS' hereinbelow) 30 may be defined in connection with a light path and represented as shown in Equation (1) below:

$$U_{BS} = \frac{1}{\sqrt{2}}\{|a\rangle\langle d|+i|a\rangle\langle c|+|b\rangle\langle c|+i|b\rangle\langle d|\} \quad (1)$$

When two photons are simultaneously input to the BS 30 via two different paths a and b, Bell States Measurement (BSM) for identifying quantum entanglement states may be performed using the PBSs 111 and 112 and the four single-photon detectors D1 to D4 (121 to 124) of Charlie 100.

For example, the case in which $$|\Phi^+\rangle = \frac{1}{\sqrt{2}}(a_1^+ b_1^+ + a_2^+ b_2^+)|0\rangle,$$

which is one of the four representative Bell states of the quantum entanglement states, is input to the BS 30, as illustrated in FIG. 1, will be described.

The BS 30 may separate the Bell state to enter into different paths using UBS operation in Equation (1).

The state separated by the BS 30 is input to the PBSs 111 and 112, and the single-photon detectors D1, D2, D3, and D4 may respond. The overall state may be represented as shown in Equation (2) below:

$$U_{BS}|\Phi^+\rangle = U_{BS}\left[\frac{1}{\sqrt{2}}(a_1^+ b_1^+ + a_2^+ b_2^+)|0\rangle\right] \quad (2)$$

$$= U_{BS}[(ic_1^+ + d_1^+)(c_1^+ + id_1^+) + (c_2^+ + d_2^+)(c_2^+ + id_2^+)]|0\rangle$$

$$= \frac{1}{2}i[c_1^+ c_1^+ + d_1^+ d_1^+ + c_2^+ c_2^+ + d_2^+ d_2^+]|0\rangle$$

According to Equation (2), it can be seen that the possibility of two simultaneous clicks at the detector D1 121, the possibility of two simultaneous clicks at the detector D2 122, the possibility of two simultaneous clicks at the detector D3 123, and the possibility of two simultaneous clicks at the detector D4 124 are present with the same probability of 1/4.

Here, the case of simultaneous clicks at a single detector may be referred to as a simultaneous detection event.

Because the simultaneous detection event may occur due to an attack from the outside or malfunction of the detector, it may be a detection result discarded in MDI-QKD. That is, the detection events configured as shown in Equation (2) are all discarded.

The results of analysis of the remaining Bell states may be represented as shown in Equations (3) to (5) below:

$$U_{BS}|\Phi^-\rangle = U_{BS}\left[\frac{1}{\sqrt{2}}(a_1^+ b_1^+ - a_2^+ b_2^+)|0\rangle\right] \quad (3)$$

$$= \frac{1}{2}i[c_1^+ c_1^+ + d_1^+ d_1^+ - c_2^+ c_2^+ - d_2^+ d_2^+]|0\rangle$$

$$U_{BS}|\Psi^+\rangle = U_{BS}\left[\frac{1}{\sqrt{2}}(a_1^+ b_2^+ + a_2^+ b_1^+)|0\rangle\right] \quad (4)$$

$$= \frac{1}{\sqrt{2}}i[c_1^+ c_2^+ + d_1^+ d_2^+]|0\rangle$$

$$U_{BS}|\Psi^-\rangle = U_{BS}\left[\frac{1}{\sqrt{2}}(a_1^+ b_2^+ - a_2^+ b_1^+)|0\rangle\right] \quad (5)$$

$$= \frac{1}{\sqrt{2}}i[c_2^+ d_1^+ - c_1^+ d_2^+]|0\rangle$$

According to Equation (2) and Equation (3), because |Φ+⟩ and |Φ−⟩ are configured with only simultaneous detection events, they cannot be used as signals for inferring keys in MDI-QKD. Conversely, according to Equation (4) and Equation (5), in the case of |ψ+⟩ and |ψ−⟩, two individual detectors respond at the same time without a simultaneous detection event, and the pairs of detectors that respond to the respective states are different. Accordingly, the states of |ψ+⟩ and |ψ−⟩ may be distinguished from each other.

The relationships between Bell states and the operations of detectors may be presented as shown in Table 1 below. In Table 1, it can be seen that $D_i D_i$ is a simultaneous detection event and is a detection event that is discarded in MDI-QKD. Here, i={1, 2, 3, 4} is satisfied. Accordingly, only the inputs |ψ+⟩ and |ψ−⟩ may be used as quantum states for key generation in MDI-QKD.

TABLE 1

| Bell State | Operation of detector (",": means "or") |
|---|---|
| \|Φ+⟩ | D1D1, D2D2, |
| \|Φ−⟩ | D3D3, D4D4 |
| \|Ψ+⟩ | D1D2, D3D4 |
| \|Ψ−⟩ | D1D3, D2D4 |

Referring to Table 1, keys may not be shared in MDI-QKD when Alice and Bob prepare the same states in the $\sigma_z$-basis ({|0⟩, |1⟩}), which is the first basis. Keys may be shared only when orthogonal states, that is, different states, are prepared in the $\sigma_z$-basis.

Analyzing $\sigma_x$-basis ({|+⟩}, {|−⟩}), which is the second basis, in the same manner as described above, keys may be shared even in the case of the same states other than the orthogonal states, but a discarded event (a simultaneous detection event in a single detector) is present with the probability of 1/2. Synthetically considering $\sigma_x$-basis, Table 2 may be acquired.

It can be seen that Table 2 illustrates detection results by detectors depending on the quantum states of Alice and Bob. In Table 2, it can be seen that $D_i D_i$ is a 'simultaneous detection event' that is handled as an error, among the detection results by detectors.

TABLE 2

| input quantum state | detection result by detector |
| --- | --- |
| $(\|0\rangle, \|0\rangle)$ | $(D_1, D_1)(D_4, D_4)$ |
| $(\|1\rangle, \|1\rangle)$ | $(D_2, D_2)(D_3, D_3)$ |
| $(\|0\rangle, \|1\rangle), (\|1\rangle, \|0\rangle)$ | $(D_1, D_2)(D_3, D_4)(D_1, D_3)(D_2, D_4)$ |
| $(\|+\rangle, \|-\rangle), (\|-\rangle, \|+\rangle)$ | $(D_1, D_1)(D_2, D_2)(D_3, D_3)(D_4, D_4)$ |
| | $(D_1, D_3)(D_2, D_4)$ |
| $(\|+\rangle, \|+\rangle), (\|-\rangle, \|-\rangle)$ | $(D_1, D_1)(D_2, D_2)(D_3, D_3)(D_4, D_4)$ |
| | $(D_1, D_2)(D_3, D_4)$ |
| $(\|+\rangle, \|0\rangle), (\|0\rangle, \|+\rangle)$ | $(D_1, D_1)(D_4, D_4)$ |
| $(\|-\rangle, \|0\rangle), (\|0\rangle, \|-\rangle)$ | $(D_1, D_2)(D_3, D_4)(D_1, D_3)(D_2, D_4)$ |
| $(\|+\rangle, \|1\rangle), (\|1\rangle, \|+\rangle)$ | $(D_2, D_2)(D_3, D_3)$ |
| $(\|-\rangle, \|1\rangle), (\|1\rangle, \|-\rangle)$ | $(D_1, D_2)(D_3, D_4)(D_1, D_3)(D_2, D_4)$ |

Hereinafter, a method for mutual authentication of quantum entities based on MDI-QKD according to an embodiment will be described.

First, rules that are shared in advance between entities for mutual authentication of quantum entities based on MDI-QKD according to an embodiment will be described as follows.

Rule 1: an authentication key such as that shown in Equation (6) below may be shared between legitimate users Alice and Bob.

$$AK = (ak_1, ak_2, \ldots, ak_n), ak_i \in \{0, 1\} \quad (6)$$

Rule 2: depending on whether the value of authentication key $ak_i$ is 0 or 1, each of the quantum states $|a\rangle_i(|b\rangle_i)$ generated by Alice or Bob may be $|0\rangle$ or $|+\rangle$.

Rule 3: Alice and Bob calculate $T_j = a_{k4j+1} \oplus a_{k4j+2} \oplus a_{k4j+3} \oplus a_{k4j+4}$. Here, j=0, 1, ..., m and m<n are satisfied. Here, when fixed quantum input that is agreed on between the users or random quantum input that is used in the MDI-QKD protocol is configured, Alice and Bob may configure the position depending on the calculated value $T_j$.

That is, when the calculated value $T_j$ is '0', quantum input form may be configured using a single position, whereas when the calculated value $T_j$ is '1', quantum input form may be configured using two positions. Assuming that the quantum agreed on as described above is $t_j(=\{t_{j0}, t_{j1}\})$, $t_{j0}$ may be a single quantum state agreed on when $T_j$ is '0', and $t_{j1}$ may be two consecutive quantum states agreed on when $T_j$ is '1' Because each quantum state occupies one position, $t_{j0}$ occupies one position and $t_{j1}$ occupies two positions in the arrangement of quantum states sequentially sent by a user.

Rule 4: Here, if 4m>n is satisfied, the remaining positions are configured with preset bits so as to satisfy 4m=n' (e.g., bit 0 or 1). Here, the bit length n' is a length including the preset bits such that the length n becomes 4m.

Rule 5: Alice may configure a single quantum input form with four input pairs, $((t_j\|ak_{4j+1})\|(t_j\|a_{k4j+2})\|(t_j\|a_{k4j+3})\|(t_j\|a_{k4j-4}))$, which are configured according to rules 1 to 3 described above. Here, "||" is for separating quantum states in the arrangement of quantum states, and "||" will be omitted hereinbelow.

FIG. 2 is an exemplary view of a quantum input form at a specific position j according to an embodiment.

Referring to FIG. 2, an example of a quantum input form that is configured when the calculated $T_j$ is '1' according to rule 3 described above, and $t_{j1}$ occupies two positions. Also, each rectangular box indicates one quantum state that is sequentially generated.

Figure 3:
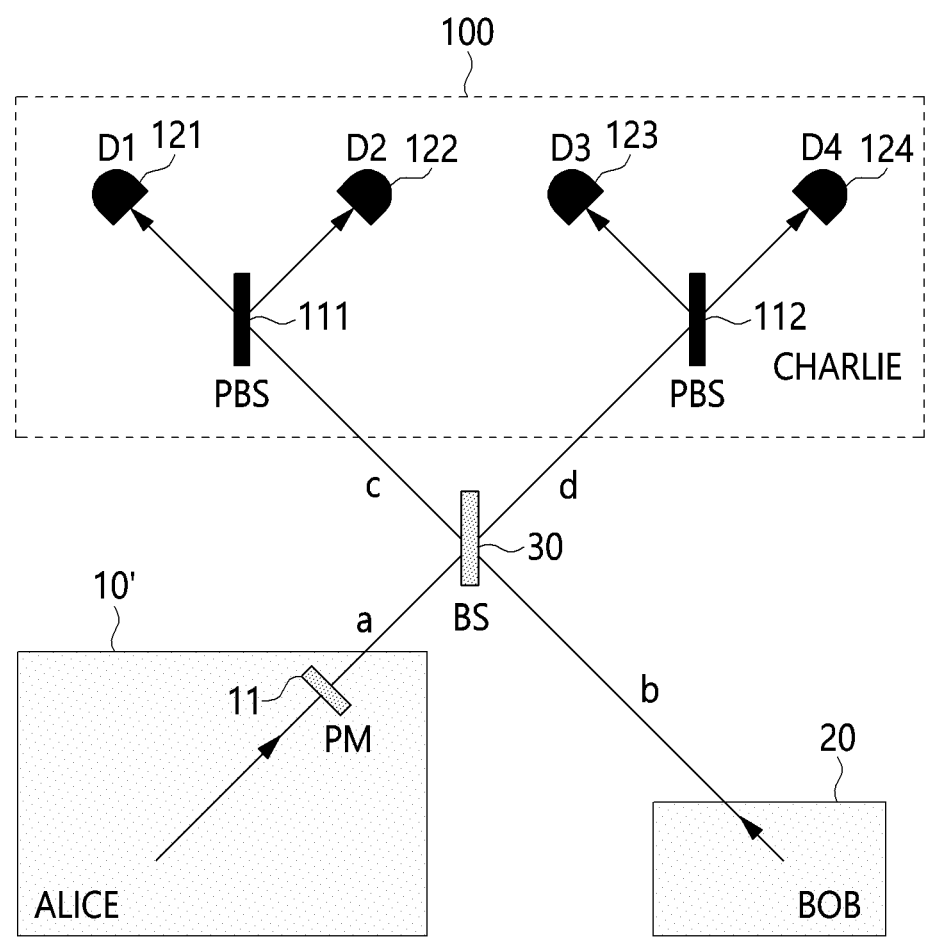
FIG. 3 is a block diagram of a system for mutual authentication of quantum entities based on MDI-QKD according to an embodiment.
Figure 4:
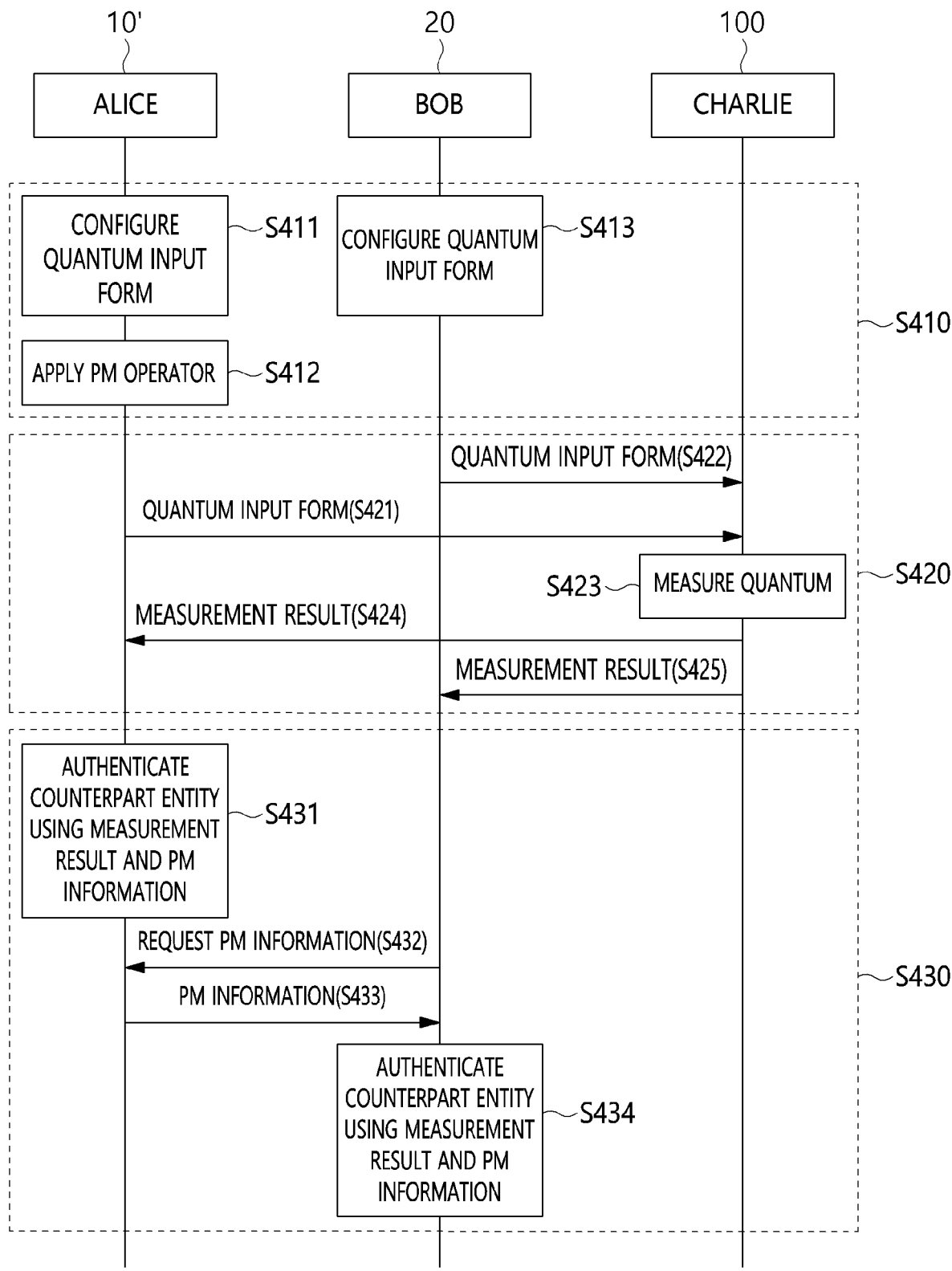
FIG. 4 is a signal flowchart for explaining a method for mutual authentication of quantum entities based on MDI-QKD according to an embodiment.

FIG. 3 is a block diagram of a system for mutual authentication of quantum entities based on MDI-QKD according to an embodiment, and FIG. 4 is a signal flowchart for explaining a method for mutual authentication of quantum entities based on MDI-QKD according to an embodiment.

Referring to FIG. 3, in the system for mutual authentication of quantum entities based on MDI-QKD according to an embodiment, a polarization modulator (PM) 11 may be added to the Alice's side 10', unlike in the MDI-QKD setup illustrated in FIG. 1.

FIG. 4 illustrates a signal flowchart according to a method in which multiple entities 10' and 20 mutually authenticate each other using information disclosed by a quantum measurement device 100, regardless of the quantum measurement device 100, in the system for quantum entity authentication based on MDI-QKD according to the embodiment illustrated in FIG. 3.

Referring to FIG. 4, the method for quantum entity authentication based on MDI-QKD according to an embodiment may include configuring, by each of multiple entities 10' and 20, a quantum input form based on an authentication key shared in advance with a counterpart entity at step S410, transmitting the quantum input form to a quantum measurement device at step S420, and authenticating the counterpart entity based on a measurement result for the quantum input form, which is disclosed by the quantum measurement device, at step S430.

Referring to FIG. 4, at step S410, the legitimate users Alice 10' and Bob 20 configure n'/4 quantum input forms depending on AK at steps S411 and S413. Here, the quantum input forms may be configured based on the above-described rules.

For example, assuming that AK=0010 0110 1101 is satisfied and that users make rules such that Alice 10' fills $T_j$ with $|1\rangle$ and Bob 20 fills $T_j$ with $|0\rangle$, j is 1, 2, and 3 according to AK. Also, according to rule 2 described above, $T_1=1$, $T_2=0$, and $T_3=1$ are satisfied.

According to the presented rules, the three quantum input forms generated by Alice 10' and Bob 20 at steps S411 and S413 may be as shown in Equation (7) and Equation (8). The configuration of these quantum input forms in Equation (7) and Equation (8) is agreed on such that the state $ak_{-\{4j+i\}}$ in rule 5 is set to $|0\rangle$ for 0 and to $|+\rangle$ for 1. This rule is a selective agreement, and it may even be possible to configure the state $ak_{-\{4j+i\}}$ with random quantum.

$$j = 1: \ |1\rangle|1\rangle|0\rangle \ |1\rangle|1\rangle|0\rangle \ |1\rangle|1\rangle|+\rangle \ |1\rangle|1\rangle|0\rangle \quad (7)$$
$$j = 2: \ |1\rangle|0\rangle \ |1\rangle|+\rangle \ |1\rangle|+\rangle \ |1\rangle|0\rangle$$
$$j = 3: \ |1\rangle|1\rangle|+\rangle \ |1\rangle|1\rangle|+\rangle \ |1\rangle|1\rangle|0\rangle \ |1\rangle|1\rangle|+\rangle$$

$$j = 1: \ |0\rangle|0\rangle|0\rangle \ |0\rangle|0\rangle|0\rangle \ |0\rangle|0\rangle|+\rangle \ |0\rangle|0\rangle|0\rangle \quad (8)$$
$$j = 2: \ |0\rangle|0\rangle \ |0\rangle|+\rangle \ |0\rangle|+\rangle \ |0\rangle|0\rangle$$
$$j = 3: \ |0\rangle|0\rangle|+\rangle \ |0\rangle|0\rangle|+\rangle \ |0\rangle|0\rangle|0\rangle \ |0\rangle|0\rangle|+\rangle$$

Referring again to FIG. 4, Alice 10' may randomly select I or $i\sigma_y$ with the probability of 1/2 by additionally using the polarization modulator (PM) 11 and apply the same at step S412.

Here, I does not change the quantum state, but $i\sigma_y$ may change the quantum state to the inverse thereof as follows.

$i\sigma_y|0\rangle = -|1\rangle$
$i\sigma_y|1\rangle = |0\rangle$
$i\sigma_y|+\rangle = |-\rangle$
$i\sigma_y|-\rangle = -|+\rangle$ When $ak_i$ is 0, Alice 10' may control the error rate by a simultaneous detection event by adjusting the ratio of the operators $\{I, i\sigma_y\}$ of the polarization modulator 11. Here, the simultaneous detection event may even be controlled to be 0.

Here, the ratio of the two operators is set such that the two operators have the same probability of 1/2. This is intended for purposely inputting an error so as not to disrupt security by configuring the measurement result statistics for the two cases in each of which $ak_i$ is 0 or 1 to be the same as each other, and the ratio may be adjusted depending on the operation environment.

That is, at the PM operator application step (S412), Alice 10' may set the ratio of the operators $\{I, i\sigma_y\}$ and apply the operator only to the position corresponding to $ak_i$ using the PM 11, whereby Equation (7) above may be reconfigured.

Subsequently, each of Alice 10' and Bob 20 sequentially transmits the quantum input forms configured at step S410 described above to Charlie 100 at steps S421 and S422.

In response thereto, Charlie 100 measures the quantum input forms respectively transmitted from Alice 10' and Bob 20 using the optical system 100 illustrated in FIG. 3 at step S423 and sequentially discloses the measurement results at steps S424 and S425.

Here, the measurement results for the quantum input forms configured by Alice 10' and Bob 20 may be represented with reference to Table 2 described above.

Accordingly, each of Alice 10' and Bob 20 may authenticate the counterpart using the measurement result disclosed by Charlie 100 at step S430.

Here, when Alice 10' authenticates Bob 20, Alice 10' may check whether Bob 20 configures the quantum input form based on AK shared with her using the disclosed measurement result and the PM information taken by her.

Also, when Bob 20 authenticates Alice 10', Bob 20 requests PM information from Alice 10' at step S432 and acquires the same at step S433. Subsequently, Bob 20 may check whether Alice 10' knows AK shared with him using the PM information transmitted by Alice 10' and the disclosed measurement result at step S434.

Here, whether the error rate statistics of the respective measurement results fall within a normal range may be checked with reference to S412 when authentication of the counterpart is performed.

For example, when Alice 10' authenticates Bob 20 at step S431, Alice 10' knows the proportion of simultaneous detection events occurring in the case in which $ak_i$ is 0 or 1 based on the information about the PM adjusted at step S412, so Alice 10' checks whether the actual measurement result follows this statistic, thereby authenticating Bob 20. In the practical environment, the numerical range for the proportion of simultaneous detection events is estimated in consideration of a channel error rate and the characteristics of detectors.

Meanwhile, when Bob 20 authenticates Alice 10' at step S434, authentication may be performed using the statistic of the proportion of simultaneous detection events in a manner similar to the manner in which Alice 10' authenticates Bob 20.

When $t_{j0}$ or $t_{j1}$ is generated according to a fixed rule by agreement between the users at step S410, after they check the result measured and disclosed by Charlie 100, each of Alice 10' and Bob 20 may use the information generated according to the fixed rule in order to calculate the error rate of the channel.

Conversely, when or is randomly generated by agreement between the users at step S410, after they check the result measured and disclosed by Charlie, Alice 10' and Bob 20 may exchange the randomly generated information with each other and use the same in order to calculate the error rate of the channel.

Figure 5:
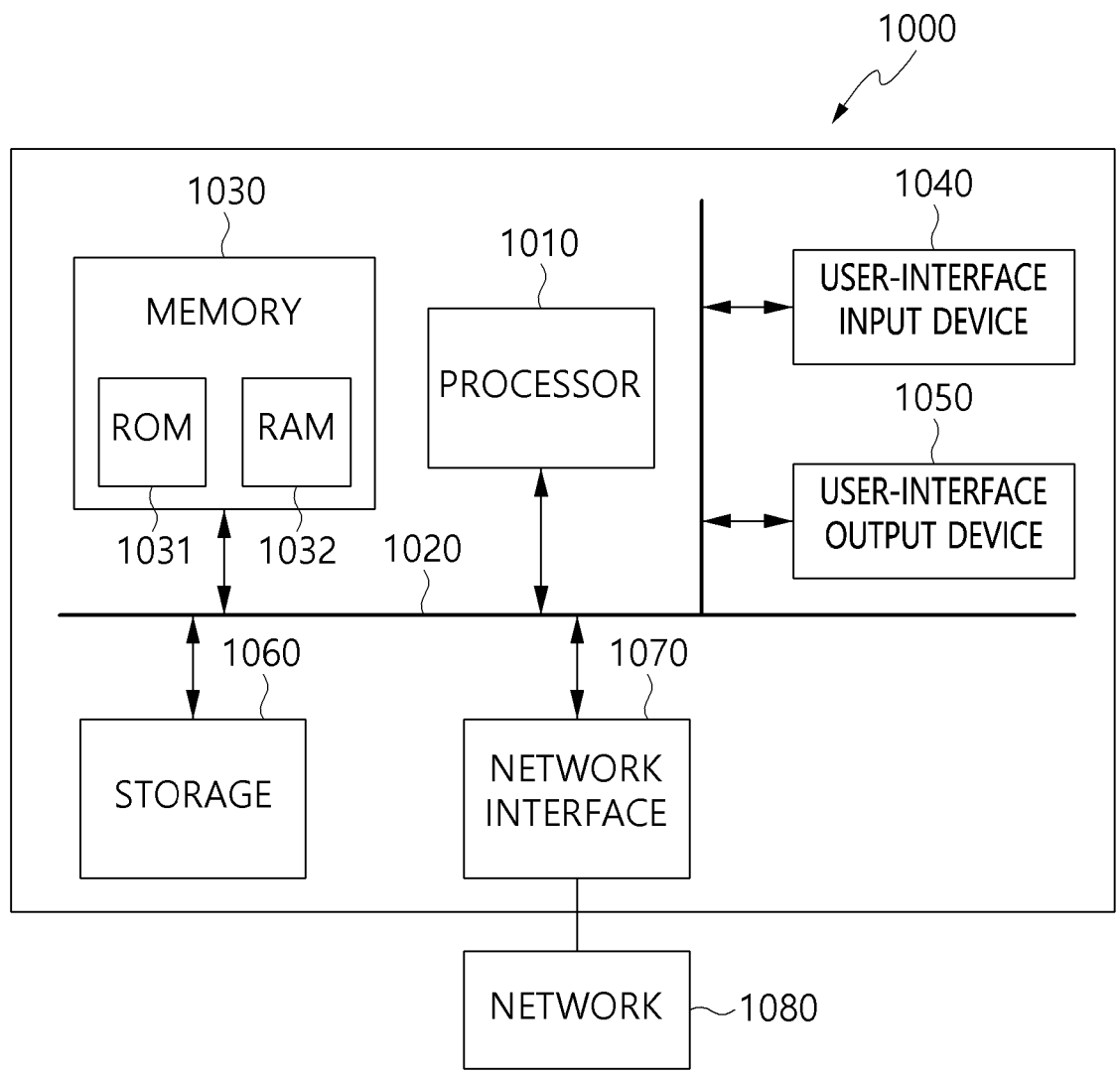
FIG. 5 is a view illustrating a computer system according to an embodiment.

FIG. 5 is a view illustrating a computer system configuration according to an embodiment.

Alice 10' and Bob 20, which are entities, and the quantum measurement device 100 according to an embodiment of the present invention may be implemented in a computer system 1000 including a computer-readable recording medium.

The computer system 1000 may include one or more processors 1010, memory 1030, a user-interface input device 1040, a user-interface output device 1050, and storage 1060, which communicate with each other via a bus 1020. Also, the computer system 1000 may further include a network interface 1070 connected to a network 1080. The processor 1010 may be a central processing unit or a semiconductor device for executing a program or processing instructions stored in the memory 1030 or the storage 1060. The memory 1030 and the storage 1060 may be storage media including at least one of a volatile medium, a nonvolatile medium, a detachable medium, a non-detachable medium, a communication medium, or an information delivery medium, or a combination thereof. For example, the memory 1030 may include ROM 1031 or RAM 1032.

According to the disclosed embodiment, security of quantum entity authentication may be guaranteed even when a measurement device is exposed to an attacker or the measurement device is not reliable.

Also, according to the disclosed embodiment, quantum entity authentication that is secure against a side-channel attack on a measurement device may be provided.

Also, because the disclosed embodiment is designed based on measurement-device-independent quantum key distribution (MDI-QKD) technology, a quantum entity authentication scheme may be applied to an MDI-QKD protocol without an additional device.

Although embodiments of the present invention have been described with reference to the accompanying drawings, those skilled in the art will appreciate that the present invention may be practiced in other specific forms without changing the technical spirit or essential features of the present invention. Therefore, the embodiments described above are illustrative in all aspects and should not be understood as limiting the present invention.

What is claimed is:

1. A method for mutual authentication of between two quantum entities based on Measurement-Device-Independent Quantum Key Distribution (MDI-QKD), comprising:
   configuring, at a first entity, a first quantum input form and configuring a second quantum input form by a second entity based on a shared authentication key which is shared in advance with each entity;
   applying polarization modulation to the first and second configured quantum input forms;
   transmitting the first and second quantum input forms to which the polarization modulation is has been applied to a quantum measurement device, wherein the quantum measurement device measures the first and second quantum input forms and produces measurement results and polarization modulation information;
   transmitting the measurement results and the polarization modulation information to the first and second entities; and
   authenticating by the first and second entity whether their counterpart entity correctly configured the quantum input form according to the shared authentication key using the measurement result and polarization modulation information received from the quantum measurement device, wherein configuring the quantum input form comprises configuring a random quantum state depending on a result value of a predetermined operation ($T_j$) performed on a preset length of an authentication key in the shared authentication key, the predetermined operation being agreed on between the users, wherein $T_j$ is determined by $T_j = a_{k4j+1} \oplus a_{k4j+2} \oplus a_{k4j+3} \oplus a_{k4j+4}$ wherein the authentication key AK is determined by AK=($ak_1$, $ak_2$, ... $ak_n$), $ak_i \in \{0, 1\}$ wherein the quantum input form is configured with a single position when $T_j$ is 0, and the quantum input form is configured with two positions when $T_j$ is 1.

2. The method of claim 1, wherein:
authenticating the counterpart entity comprises calculating an error rate of a channel based on the measurement result, and
if the random quantum state is used when configuring the quantum input form, the error rate of the channel is calculated by exchanging the random quantum state with the counterpart entity.

3. The method of claim 1, wherein applying the polarization modulation comprises adjusting a ratio of operators of the polarization modulation so as to control an error rate by a simultaneous detection event according to the authentication key.

4. The method of claim 3, wherein authenticating the counterpart entity comprises checking whether an error rate statistic of the measurement result falls within a normal range based on information about adjustment of the ratio of the operators of the polarization modulation.

5. A method for mutual authentication of between two quantum entities based on Measurement-Device-Independent Quantum Key Distribution (MDI-QKD), comprising:
configuring, at a first entity, a first quantum input form and configuring a second quantum input form by a second entity based on a shared authentication key which is shared in advance with each entity;
transmitting the configured quantum input forms to a quantum measurement device;
acquiring polarization modulation information from their counterpart entity by requesting the polarization modulation information; and
authenticating by the first and second entity whether their counterpart entity correctly configured the quantum input form according to the shared authentication key using the measurement result and polarization modulation information received from the quantum measurement device,
wherein configuring the quantum input form comprises configuring a random quantum state depending on a result value of a predetermined operation ($T_j$) performed on a preset length of an authentication key in the shared authentication key, the predetermined operation being agreed on between the users, wherein T is determined by $T_j = a_{k4j+1} \oplus a_{k4j+2} \oplus a_{k4j+3} \oplus a_{k4j+4}$ wherein the authentication key AK is determined by AK=($ak_1$, $ak_2$, ... $ak_n$), $ak_i \in \{0, 1\}$ wherein the quantum input form is configured with a single position when $T_j$ is 0, and the quantum input form is configured with two positions when $T_j$ is 1.

6. The method of claim 5, wherein configuring the quantum input form comprises varying a generation basis of a quantum state depending on a value of the shared authentication key.

7. The method of claim 6, wherein:
authenticating the counterpart entity comprises calculating an error rate of a channel based on the measurement result, and
if the random quantum state is used when configuring the quantum input form, the error rate of the channel is calculated by exchanging the random quantum state with the counterpart entity.

8. An apparatus for authenticating quantum entities, comprising:
memory in which at least one program is recorded; and
a processor for executing the program,
wherein the program performs
configuring, at a first entity, a first quantum input form and configuring a second quantum input form by a second entity based on a shared authentication key which is shared in advance with each entity,
transmitting the configured quantum input form to a quantum measurement device, and
authenticating by the first and second entity whether their counterpart entity correctly configured the quantum input form according to the shared authentication key using a measurement result and polarization modulation information received from the quantum measurement device,
wherein configuring the quantum input form comprises configuring a random quantum state depending on a result value of a predetermined operation ($T_j$) performed on a preset length of an authentication key in the shared authentication key, the predetermined operation being agreed on between the users, wherein T is determined by $T_j = a_{k4j+1} \oplus a_{k4j+2} \oplus a_{k4j+3} \oplus a_{k4j+4}$ wherein the authentication key AK is determined by AK=($ak_1$, $ak_2$, ... $ak_n$), $ak_i \in \{0, 1\}$ wherein the quantum input form is configured with a single position when T is 0, and the quantum input form is configured with two positions when T is 1.

9. The apparatus of claim 8, wherein:
when authenticating the counterpart entity, the program calculates an error rate of a channel based on the measurement result, and
if the random quantum state is used when configuring the quantum input form, the program calculates the error rate of the channel by exchanging the random quantum state with the counterpart entity.

10. The apparatus of claim 8, wherein the program further performs applying polarization modulation to the configured quantum input form and adjusts a ratio of operators of the polarization modulation so as to control an error rate by a simultaneous detection event according to the authentication key.

11. The apparatus of claim 10, wherein, when authenticating the counterpart entity, the program checks whether an error rate statistic of the measurement result falls within a normal range based on information about adjustment of the ratio of the operators of the polarization modulation.

12. The apparatus of claim 8, wherein:
the program further performs acquiring polarization modulation information from the counterpart entity by requesting the polarization modulation information, and
when authenticating the counterpart entity, the program checks whether the counterpart entity configures a quantum input form according to the shared authentication key using the measurement result and the polarization modulation information acquired from the counterpart entity.

13. The apparatus of claim 12, wherein, when authenticating the counterpart entity, the program checks whether an error rate statistic of the measurement result falls within a normal range based on information about adjustment of a ratio of operators of polarization modulation, which is acquired from the counterpart entity.

* * * * *